United States Patent

Aufrere et al.

[11] Patent Number: 5,988,756
[45] Date of Patent: Nov. 23, 1999

[54] METHOD OF MAKING A VEHICLE SEAT, AND A VEHICLE SEAT MADE BY THE METHOD

[75] Inventors: Christophe Aufrere, Marcoussis; Mark Moller, Massy; François Sensby, Chatenay Malabry; Joël Canteleux, Armenonville, all of France

[73] Assignee: Bertrand Faure Equipements SA, Boulogne, France

[21] Appl. No.: 08/941,411

[22] Filed: Sep. 30, 1997

[30] Foreign Application Priority Data

Oct. 2, 1996 [FR] France .................................. 96 12005

[51] Int. Cl.⁶ .................................................. A47C 7/02
[52] U.S. Cl. ................................ 297/452.18; 297/452.2; 297/391; 72/58
[58] Field of Search ......................... 297/452.18, 452.2, 297/216.1, 216.13, 216.14, 216.15, 216.16, 216.19, 391; 72/58, 59, 57, 56; 29/421.1

[56] References Cited

U.S. PATENT DOCUMENTS

| | | | |
|---|---|---|---|
| 4,192,545 | 3/1980 | Higuchi et al. | 297/216.1 |
| 4,373,235 | 2/1983 | Volpe | 29/416 |
| 5,050,932 | 9/1991 | Pipon et al. | 297/452.18 X |
| 5,070,717 | 12/1991 | Boyd et al. | 72/55 |
| 5,107,693 | 4/1992 | Olszewski et al. | 72/58 |
| 5,233,854 | 8/1993 | Bowman et al. | 72/58 |
| 5,239,852 | 8/1993 | Roper | 72/58 |
| 5,246,271 | 9/1993 | Boisset | 297/452.2 X |
| 5,310,247 | 5/1994 | Fujimori et al. | 297/452.18 X |
| 5,318,341 | 6/1994 | Griswold et al. | 297/452.18 X |
| 5,333,775 | 8/1994 | Bruggemann et al. | 228/157 |
| 5,339,667 | 8/1994 | Shah et al. | 72/58 |
| 5,362,132 | 11/1994 | Griswold et al. | 297/452.2 X |
| 5,447,360 | 9/1995 | Hewko et al. | 297/452.18 |
| 5,452,941 | 9/1995 | Halse et al. | 297/452.2 X |
| 5,468,053 | 11/1995 | Thompson et al. | 297/452.18 X |
| 5,501,509 | 3/1996 | Urrutia | 297/452.18 |
| 5,509,716 | 4/1996 | Kolena et al. | 297/452.18 X |
| 5,547,214 | 8/1996 | Zimmerman, II et al. | 280/730.2 X |
| 5,547,259 | 8/1996 | Frederick | 297/452.18 |
| 5,561,902 | 10/1996 | Jacobs et al. | 72/61 X |
| 5,564,785 | 10/1996 | Schultz et al. | 297/452.2 |
| 5,567,017 | 10/1996 | Bourgeois et al. | 297/452.18 X |
| 5,626,396 | 5/1997 | Kuragano et al. | 297/391 X |
| 5,660,443 | 8/1997 | Pedronne | 297/452.2 |
| 5,685,614 | 11/1997 | Chabanni | 297/452.2 |
| 5,697,670 | 12/1997 | Husted et al. | 297/452.18 X |
| 5,711,577 | 1/1998 | Whalen | 297/452.18 X |

FOREIGN PATENT DOCUMENTS

| | | |
|---|---|---|
| 2 677 935 | 6/1991 | France . |
| 44 00 419 A1 | 7/1995 | Germany . |

*Primary Examiner*—Peter M. Cuomo
*Assistant Examiner*—Rodney B. White
*Attorney, Agent, or Firm*—Marshall, O'Toole, Gerstein, Murray & Borun

[57] ABSTRACT

A method of making a vehicle seat in which the strength member of the back has a first upright connected to the strength member of the seat proper by a hinge mechanism, a second upright that is not as strong as the first and that is hinged to the strength member of the seat proper, and two horizontal cross-members, the two cross-members and the top portion of the second upright being constituted by a tube folded into a general U-shape and of section that varies along its length. The method includes a step which consists in imparting the final shape to the tube by hydroforming, starting from an initial tube of substantially constant section.

7 Claims, 2 Drawing Sheets

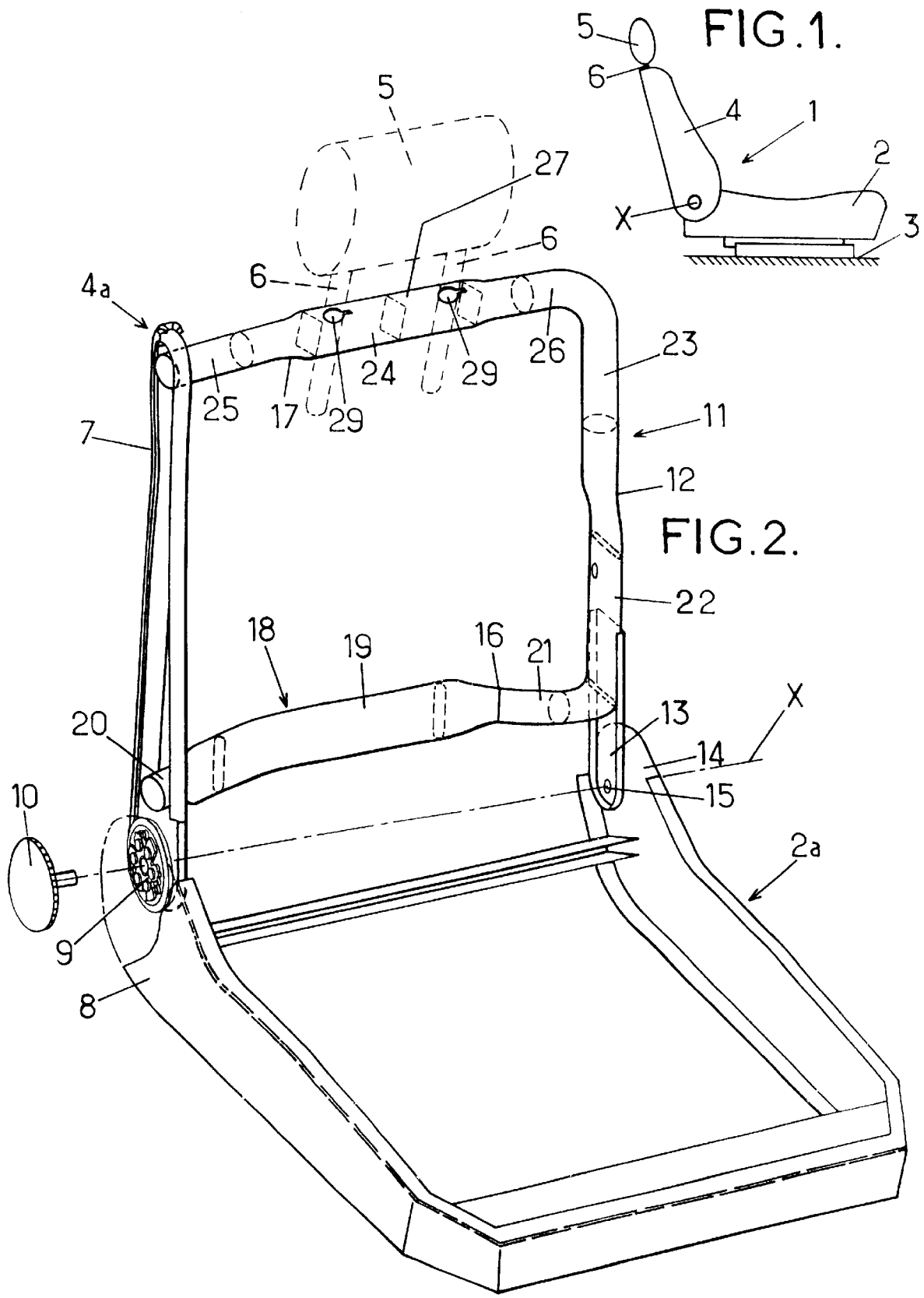

METHOD OF MAKING A VEHICLE SEAT, AND A VEHICLE SEAT MADE BY THE METHOD

FIELD OF THE INVENTION

The present invention relates to methods of making vehicle seats, and to vehicle seats made by such methods.

More particularly, the invention seeks to make a motor vehicle seat comprising a seat proper and a seat back, each having a metal strength member, the strength member of the back being pivotally mounted on the strength member of the seat proper about a transverse horizontal axis of rotation by means of at least one hinge mechanism adapted to enable the inclination of the back to be adjusted and to lock the back once adjusted, the strength member of the back forming a frame having:

- a first side upright connected to the strength member of the seat proper via said hinge mechanism;
- a second side upright, that is not as strong as the first upright, said second upright having a tubular portion secured to a side plate which extends said tubular portion downwards and which is hinged to the strength member of the seat proper; and
- two substantially horizontal cross-members, respectively a bottom cross-member and a top cross-member, which interconnect the two side uprights, the frame comprising a tube folded into a general U-shape having a web constituting the tubular portion of the second side upright and two limbs constituting the two cross-members.

BACKGROUND OF THE INVENTION

Such a vehicle seat is disclosed in document U.S. Pat. No. 4,192,545.

The strength member of the seat back described in that document comprises a generally U-shaped tube of constant circular section along its length, such that the mechanical performance of said back strength member is limited.

In particular, given the draconian safety standards presently in force for vehicle seats, a seat back strength member made in accordance with the teaching of the above-mentioned document and complying with the standards:

- would need to use a tube of relatively large section and of relatively great wall thickness; and
- would necessarily need to use two hinge mechanisms for connecting the two side uprights respectively to the strength member of the seat proper.

That would give rise to a seat back strength member that is relatively heavy and expensive.

OBJECTS AND BRIEF SUMMARY OF THE INVENTION

The present invention seeks in particular to mitigate those drawbacks.

To this end, according to the invention, in a motor vehicle seat of the kind in question, in which the strength member of the back is pivotally mounted on the strength member of the seat proper by means of at least one hinge mechanism connecting the first upright to said strength member of the seat proper, and in which the second upright is also hinged to the strength member of the seat proper (either by means of a simple pivot or by means of a second hinge mechanism), the generally U-shaped tube is of section that varies along its length, and the seat is made by a method that includes a step in which an initial tube of substantially constant section has the final shape of the U-shaped tube imparted thereto by hydroforming.

By means of these dispositions, it is possible to adapt the shape of the tube very finely to optimizing its mechanical strength as a function of the stresses to which it is subjected locally, thereby making it possible to use a tube of relatively small section and wall thickness, while still having the possibility of using only one hinge mechanism for mounting the strength member of the back on the strength member of the seat proper.

This gives rise to a vehicle seat whose back strength member can be stronger than in existing seats, while still being lighter in weight and less expensive.

Advantageously, holes are also punched in the generally U-shaped tube during the hydroforming step, towards the end of said step.

The invention also provides a motor vehicle seat made by the above method by using a tube that is initially of circular section, in which the web of the U-shape has a bottom length which is flattened in a vertical plane perpendicular to the axis of rotation.

In preferred embodiments of the seat of the invention, use may optionally be made of one or more of the following dispositions:

- the flattened bottom length represents at least one-third of the length of the web of the U-shape;
- the side plate of the second upright is welded to the flattened bottom length of the web of the U-shape;
- the top cross-member and the two side uprights of the strength member of the back lie in a common plane, and the bottom cross-member has a central portion which is flattened substantially parallel to said plane, the bottom cross-member being curved so as to project rearwards from said plane;
- the top cross-member has two end portions of substantially circular section on either side of a central portion of substantially rectangular section, the vertical dimension of said central portion being greater than that of said end portions, the central portion of the top cross-member having a top face pierced by two orifices and a bottom face parallel to the top face and also pierced by two orifices placed in register with the orifices of the top face, the seat also including a headrest which is supported by two rods each slidably mounted in a corresponding pair of said orifices;
- the top cross-member and the two side uprights of the strength member of the back lie in a common plane, the top and bottom faces of the central portion of the top cross-member being inclined forwards relative to said plane, and the rods of the headrest being substantially perpendicular to said top and bottom faces;
- the seat includes a single hinge mechanism connecting the first side upright to the strength member of the seat proper, while the second side upright is mounted on the strength member of the seat proper by means of a simple pivot; and
- the first side upright carries at least one element selected from:
  air bags inflatable in the event of a shock; and
  electric control devices, in particular for adjusting the seat.

BRIEF DESCRIPTION OF THE DRAWINGS

Other characteristics and advantages of the invention appear from the following detailed description of an embodiment thereof, given by way of non-limiting example and with reference to the accompanying drawings.

In the drawings:

FIG. 1 is a diagrammatic view showing a vehicle seat of the invention;

FIG. 2 is a perspective view of the strength member of the seat of FIG. 1;

MORE DETAILED DESCRIPTION

Figure 3:
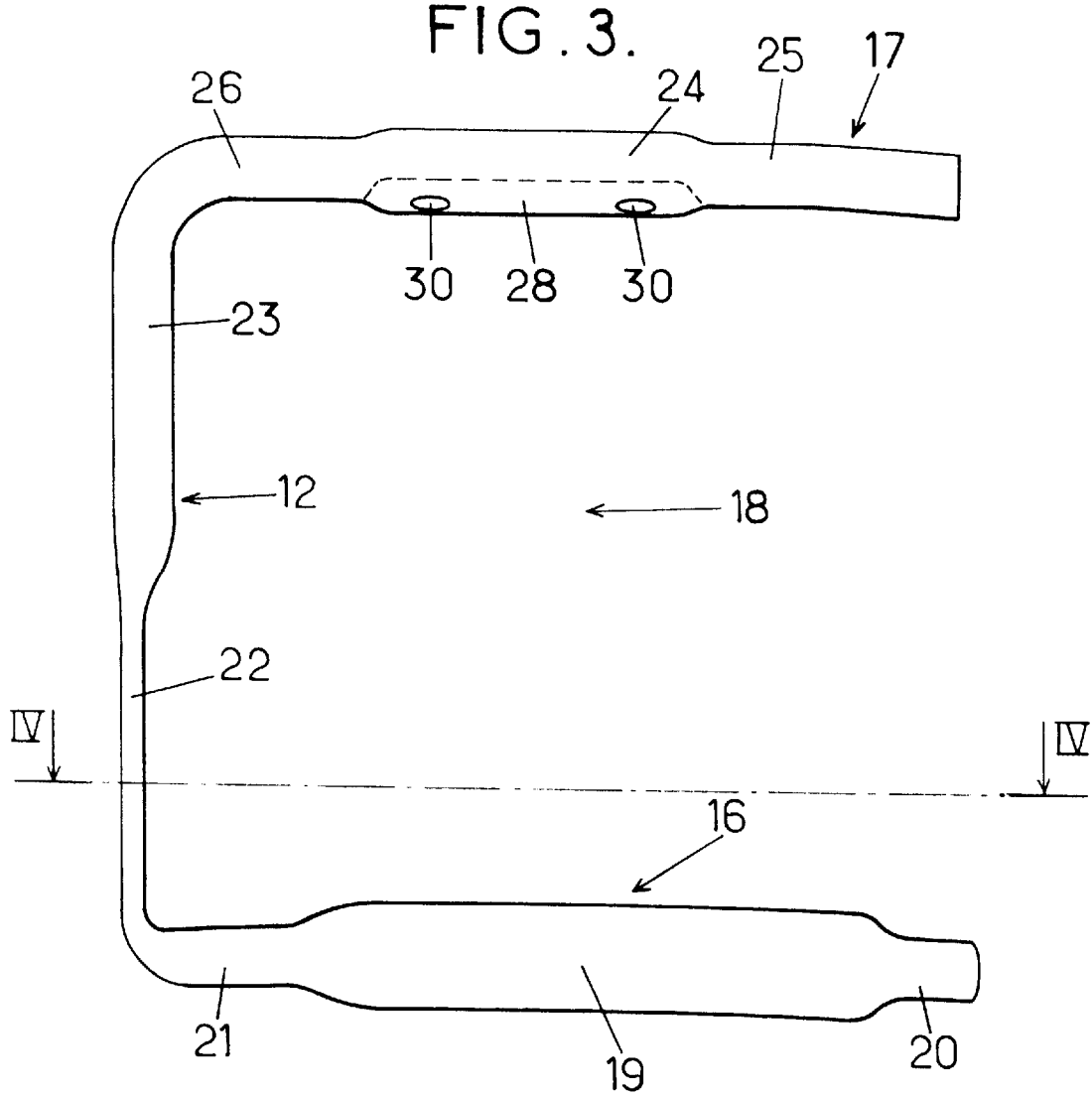
FIG. 3 is a rear view of the generally U-shaped tube belonging to the strength member of the back of the FIG. 2 seat.

As shown in FIG. 1, the invention relates to a motor vehicle seat 1, in particular a front seat, which comprises: firstly a seat proper 2 mounted on the floor 3 of the vehicle; and secondly a seat back 4 mounted on the seat proper 2 in such a manner as to be capable of pivoting about a transverse horizontal axis X.

The back 4 is preferably extended upwards by a headrest 5 which is mounted to slide vertically on the back by means of two metal rods 6 which penetrate into the top portion of the back 4.

As shown in FIG. 2, the seat proper 2 and the back 4 include respective metal strength members 2a and 4a that are substantially in the form of a frame.

The strength member 4a of the back comprises:

a first side upright 7 which constitutes a strong beam, whose bottom end is connected to a first vertical side plate 8 of the strength member of the seat proper via a hinge mechanism 9, which hinge mechanism is known per se and is adapted to enable the inclination of the back to be adjusted by means of a knob 10 and to lock the back once adjusted, the side upright 7 also being capable of supporting, where appropriate, a bag that is inflatable in the event of a shock (an "air bag") and/or electric control switches serving, in particular, for adjusting the seat if the seat is motorized;

a second side upright 11 comprising firstly a tubular portion 12 and secondly a sheet metal side plate 13 which is welded to the tubular portion 12 and which extends it downwards, the side plate 13 being connected to a second vertical side plate 14 of the strength member of the seat proper via a simple, freely-rotating pivot 15, or indeed via a second hinge mechanism; and two cross-members 16 and 17 respectively at the bottom and at the top which interconnect the two side uprights 7 and 11, the two cross-members forming parts of the same generally U-shaped metal tube 18, with the web of the U-shape being constituted by the tubular portion 12 of the second side upright.

The hinge mechanism 9, and also the optional second hinge mechanism which may optionally be provided to connect the second side upright 11 to the strength member 2a of the seat proper, may:

either be of the "continuous" type, generally comprising an (internal) epicyclic gear system, in which the angular adjustment of the seat back is controlled positively by angular displacement of a drive member actuated manually or by a motor;

or else be of the "discontinuous" type, in which the sole effect of actuating a drive member is to release the seat back, with the inclination of the back then being adjusted by the user of the seat by acting directly on the back.

Figure 4:
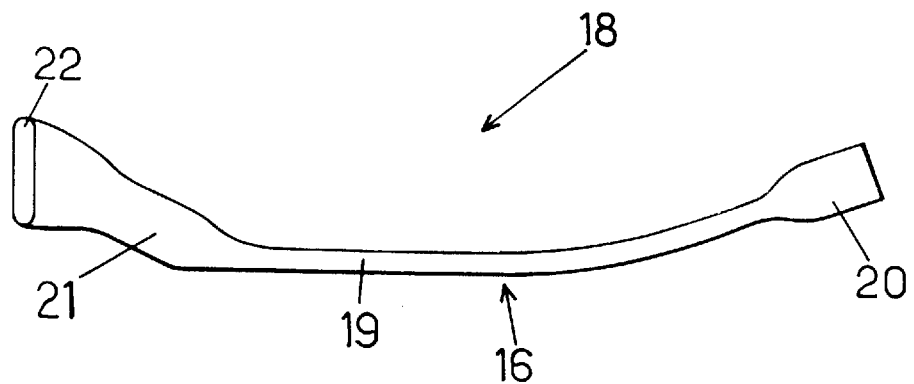
FIG. 4 is a section view on line IV—IV of FIG. 3.

As can be seen in FIGS. 2 to 4, the tube 18 is complex in shape, since its section and its general shape are optimized at each point along its length as a function of the mechanical stresses to which the tube is locally subject.

In particular, the bottom cross-member 16 has a central portion 19 which is flattened parallel to the general plane defined by the two side uprights 7 and 11 and by the top cross-member 17, said central portion 19 being located between two portions of tube 20 and 21 that are of substantially circular section, with the bottom cross-member 16 being curved overall so as to project rearwards from the above-mentioned general plane.

These dispositions make it possible to ensure that the axis of rotation X is situated in a position that is fairly well forward relative to the general bulk of the seat proper.

In this case, it is preferable to use a single "continuous" or "discontinuous" type hinge mechanism 9, or where appropriate two "discontinuous" hinge mechanisms with actuation thereof being synchronized by means of a link cable interconnecting the two mechanisms.

Nevertheless, it should be observed that when it is not essential for the axis of rotation X to be located particularly far forwards, the bottom cross-member 16 need not necessarily be curved, and it would then optionally be possible to provide two "continuous" hinge mechanisms on either side of the seat and interconnected by means of a straight link bar for synchronizing actuation of the two mechanisms.

The special shape of the tubular portion 12 of the second upright plays a crucial role in obtaining high mechanical strength for the strength member 4a of the back.

This tubular portion 12 has a bottom length 22 which is flattened in a vertical plane perpendicular to the axis of rotation X, beneath a length 23 of circular section, the flattened bottom length 22 extending, for example, over at least one-third of the length of the tubular portion 12.

This flattened shape of the bottom length 22 of the tubular portion 12 serves to ensure that the second side upright 11 presents great strength against forces perpendicular to the general plane of the back.

In addition, this flattened shape also makes it easy to weld the side plate 13 onto the tubular portion 12 of the second upright 11.

Finally, and advantageously, the top cross-member 17 has a central portion 24 of rectangular section, between two lengths 25 and 26 of circular section that are smaller than the portion of rectangular section.

The central portion 24 of rectangular section has a top face 27 pierced by two orifices 29 and a bottom face 28 parallel to the top face and pierced by two orifices 30 in register with the orifices in the top face, the rods 6 of the headrest being slidably mounted in respective pairs of corresponding orifices 29 and 30, optionally with a ring of plastics material between the rods 6 and the edges of the orifices 29 and 30.

Because the central portion 24 of the top cross-member 17 has a vertical section greater than that of the lengths 25 and 26, the rods 6 are particularly well guided in vertical sliding.

When it is desirable for the rods 6 to be inclined forwards a little, the top and bottom faces 27 and 28 are themselves also inclined forwards a little, said faces being in any event perpendicular to the rods 6.

According to the invention, the U-shaped tube 18 is made by the known hydroforming process which consists in:

closing the open ends of the tube 18 which is initially circular in section; and then injecting into the tube a liquid under very high pressure (in the range 700 bars to 2000 bars), the tube 18 being disposed in a matrix whose shape it takes up.

The matrix enables the rectangular section portion 24 of the tube 18 to expand and it also flattens the flattened zones 19 and 22 of the tube and curves the bottom cross-member 16, while optionally simultaneously imparting their final shapes to the bends situated between the tubular portion 12 and the respective cross-members 16 and 17.

In addition, during the hydroforming step, and more particularly towards the end of this step, it is advantageous to pierce all of the holes that are to be formed in the tube 18 by punching, and in particular to punch the above-mentioned orifices 29 and 30: holes are thus obtained without swarf and without local deformation of the tube 18, and a subsequent drilling operation is avoided.

We claim:

1. A method of making a motor vehicle seat comprising a seat proper and a seat back, each having a metal strength member, the strength member of the back being pivotally mounted on the strength member of the seat proper about a transverse horizontal axis of rotation by means of at least one hinge mechanism adapted to adjust the back angularly and to lock the back once adjusted, the strength member of the back forming a frame having:

a first side upright connected to the strength member of the seat proper via said hinge mechanism;

a second side upright, that is weaker than the first upright, said second upright having an upper tubular portion secured to a lower side plate which is hinged to the strength member of the seat proper; and two substantially horizontal cross-members respectively a bottom cross-member and a top cross-member which interconnect the two side uprights, the frame comprising a tube initially of circular cross-section and folded into a general U-shape having a web constituting the tubular portion of the second side upright and two limbs constituting the two cross-members, and the tube having a cross-section which varies in shape along its length, the web of the U-shape having a bottom length which is flattened in a vertical plane perpendicular to the axis of rotation;

wherein the top cross-member has two end portions of substantially circular cross-section on either side of a central portion of substantially rectangular cross-section, each of said central and end portions having a vertical dimension, and the vertical dimension of said central portion being greater than the vertical dimension of said end portions, the central portion of the top cross-member having a top face pierced by two orifices and also a bottom face parallel to the top face and pierced by two orifices placed in register with the orifices of the top face, the seat also including a headrest which is supported by two rods each slidably mounted in a corresponding pair of said orifices; the method including a step which consists in imparting the final shape to the U-shaped tube by hydroforming, starting from an initial tube having a cross-section of section that is substantially constant.

2. A method according to claim 1, in which said hydroforming step has an end, and in which holes are also punched in the generally U-shaped tube during the hydroforming step, towards the end of said step.

3. A method according to claim 1, in which the flattened bottom length represents at least one-third of the length of the web of the U-shape.

4. A method according to claim 1, in which the side plate of the second upright is welded to the flattened bottom length of the web of the U-shape.

5. A method according to claim 1, in which the top cross-member and the two side uprights of the strength member of the back lie in a common plane, and in which the bottom cross-member has a central portion which is flattened substantially parallel to said plane, the bottom cross-member being curved so as to project rearwards from said plane.

6. A method according to claim 1, in which the top cross-member and the two side uprights of the strength member of the back lie in a common plane, and in which the top and bottom faces of the central portion of the top cross-member are inclined forwards relative to said plane, the rods of the headrest being substantially perpendicular to said top and bottom faces.

7. A method according to claim 1, including a single hinge mechanism connecting the first side upright to the strength member of the seat proper, while the second side upright is mounted on the strength member of the seat proper by means of a simple pivot.

* * * * *